United States Patent
Zheng et al.

(10) Patent No.: US 8,985,684 B2
(45) Date of Patent: Mar. 24, 2015

(54) SINGLE ARM ADJUSTMENT MECHANISM FOR SUPPORTING AN OBJECT

(75) Inventors: Guoying Zheng, Singapore (SG); Soo Siong Richard Tan, Singapore (SG); Kuan Sheng Tan, Singapore (SG)

(73) Assignee: Singapore Technologies Aerospace Ltd, Singapore (SG)

( * ) Notice: Subject to any disclaimer, the term of this patent is extended or adjusted under 35 U.S.C. 154(b) by 0 days.

(21) Appl. No.: 13/993,936

(22) PCT Filed: Oct. 24, 2011

(86) PCT No.: PCT/SG2011/000372
§ 371 (c)(1),
(2), (4) Date: Jul. 17, 2013

(87) PCT Pub. No.: WO2012/082071
PCT Pub. Date: Jun. 21, 2012

(65) Prior Publication Data
US 2014/0312669 A1    Oct. 23, 2014

(30) Foreign Application Priority Data
Dec. 16, 2010    (SG) ................. 201009364-9

(51) Int. Cl.
A47B 3/14        (2006.01)
A47B 83/02       (2006.01)
F16M 11/06       (2006.01)
A47C 7/68        (2006.01)
A47C 7/46        (2006.01)
A47C 7/54        (2006.01)

(52) U.S. Cl.
CPC ............... *A47B 83/02* (2013.01); *F16M 11/06* (2013.01); *A47C 7/68* (2013.01); *A47C 7/462* (2013.01); *A47C 7/54* (2013.01)
USPC .......................................................... 297/161

(58) Field of Classification Search
USPC .......................................................... 297/161
See application file for complete search history.

(56) References Cited

U.S. PATENT DOCUMENTS

| 289,384 | A | * | 12/1883 | Byrkit | 248/454 |
| 1,384,861 | A | * | 7/1921 | Schingel | 248/454 |
| 2,567,593 | A | * | 9/1951 | Bemis | 108/4 |

(Continued)

FOREIGN PATENT DOCUMENTS

| AU | 2008100585 A4 | 7/2008 |
| DE | 4343242 A1 | 6/1995 |

OTHER PUBLICATIONS

International Search Report and Written Opinion for PCT/SG2011/000372, dated Jan. 3, 2012, 9 pages.

(Continued)

*Primary Examiner* — Rodney B White
(74) *Attorney, Agent, or Firm* — Hovey Williams LLP (57) ABSTRACT

Disclosed herein is a single arm adjustment mechanism for supporting an object, the single arm adjustment mechanism comprising: a support arm; an upper adjustment assembly coupled to an upper end of said support arm, said upper adjustment assembly capable of being coupled to said object such that said object pivots about a first axis; and a lower adjustment assembly capable of being fixed to a support and pivotally coupled to a lower end of said support arm such that said support arm pivots about a second axis parallel to said first axis in order to maintain said object in a desired angular orientation with respect to said support.

10 Claims, 8 Drawing Sheets

(56) References Cited

U.S. PATENT DOCUMENTS

| | | | | |
|---|---|---|---|---|
| 3,041,034 A | * | 6/1962 | Wilkinson | 248/284.1 |
| 3,543,312 A | * | 12/1970 | Giancarlo | 108/49 |
| 4,277,102 A | * | 7/1981 | Aaras et al. | 297/411.36 |
| 4,682,749 A | * | 7/1987 | Strater | 248/284.1 |
| 5,029,941 A | * | 7/1991 | Twisselmann | 297/411.38 |
| 5,275,465 A | * | 1/1994 | Gulliver et al. | 297/173 |
| 5,476,304 A | * | 12/1995 | Gulliver et al. | 297/173 |
| 5,547,247 A | | 8/1996 | Dixon | |
| 5,615,620 A | * | 4/1997 | Owen | 248/458 X |
| 5,653,499 A | * | 8/1997 | Goodall | 297/170 |
| 5,765,911 A | * | 6/1998 | Sorenson | 297/161 X |
| 5,931,102 A | | 8/1999 | Grahl | |
| 6,132,018 A | * | 10/2000 | McGrath | 312/140.4 |
| 6,375,259 B1 | * | 4/2002 | Ma | 297/173 X |
| 6,425,631 B1 | * | 7/2002 | Lin | 297/173 |
| 6,427,957 B1 | | 8/2002 | Finneman et al. | |
| 6,702,373 B2 | * | 3/2004 | Rossko | 297/173 |
| 7,784,862 B2 | | 8/2010 | Pozzi et al. | |
| 7,871,130 B2 | * | 1/2011 | da Silva Netto et al. | 297/408 |
| 8,702,049 B2 | * | 4/2014 | Vieira | 248/245 |
| 8,733,722 B2 | * | 5/2014 | Hung | 248/276.1 |
| 2002/0003361 A1 | | 1/2002 | Duerr et al. | |
| 2008/0073946 A1 | * | 3/2008 | Maione | 297/161 |

OTHER PUBLICATIONS

International Preliminary Report on Patentability for PCT/SG2011/000372, dated Oct. 4, 2012, 4 pages.

* cited by examiner

SINGLE ARM ADJUSTMENT MECHANISM FOR SUPPORTING AN OBJECT

RELATED APPLICATION

The present application is a national stage application under 35 U.S.C. §371 of International Application No. PCT/SG2011/000372, filed Oct. 24, 2011, which claims the priority of Singapore Application No. 201009364-9, filed Dec. 16, 2010, both of which are expressly incorporated by reference herein in their entireties.

FIELD OF INVENTION

Embodiments of the present invention relate to a single arm adjustment mechanism for supporting an object that allows the object to be rotated, raised and lowered. Embodiments of the present invention are particularly suited for aircraft or vehicle tables, video screens and the like.

BACKGROUND

Various types of single arm adjustment mechanisms are currently available. For example, aircraft seats may be fitted with a single arm supported table which provides an eating and/or working surface for the occupant of the seat.

Unfortunately, current single arm mechanisms are only minimally adjustable. For example, with respect to a single arm supported table used in an aircraft or vehicle, current adjustment mechanisms may provide for a limited adjustability of the table towards or away from the seat occupant. These mechanisms also do not allow for the table to be raised or lowered. Additionally, these mechanisms do not allow the table to be rotated away from the use to facilitate entry/exit from the seat. These mechanisms also do not provide any capability to allow the table angle to be changed to suit user preferences.

It would therefore be a great improvement in the art if a single arm adjustment mechanism could be provided which addresses one or more of these deficiencies.

SUMMARY

According to a first aspect of the present invention, there is provided a single arm adjustment mechanism for supporting an object, the single arm adjustment mechanism comprising a support arm; an upper adjustment assembly coupled to an upper end of said support arm, said upper adjustment assembly capable of being coupled to said object such that said object pivots about a first axis; and a lower adjustment assembly capable of being fixed to a support and pivotally coupled to a lower end of said support arm such that said support arm pivots about a second axis parallel to said first axis in order to maintain said object in a desired angular orientation with respect to said support.

The upper adjustment assembly may comprise a housing coupled to said upper end of said support arm; a connecting cylinder having a gear, said connecting cylinder disposed within the housing such that said connecting cylinder is free to rotate within said housing; a base coupled to said connecting cylinder; and an object attaching block slidingly disposed within said base, said object attaching block including a lower portion configured to engage with said gear; wherein said object is coupled to said object attaching block, such that said object may be raised to disengage said lower portion of said object attaching block to allow said object to be rotated about said first axis to a desired position, and said object may be lowered to engage said lower portion of said object attaching block to fix said object in said desired position.

The connecting cylinder may further comprise a first roller having a linear slot offset from an axis of said cylinder, said first roller being coupled to one side of said gear; a first slide disposed within said linear slot of said first roller; a second roller having a linear slot offset from an axis of said cylinder, said second roller being coupled to an opposite side of said gear; and a second slide disposed within said linear slot of said second roller; wherein said base is coupled to said first and second slides such that said first and second slides restrict rotational movement of said cylinder to less than 180 degrees.

The lower adjustment assembly may further comprise a lower adjustment assembly base; and a pivoting member coupled to said support arm such that said support arm pivots about said second axis, said pivoting member having a spindle extending through said lower adjustment assembly base, such that said support arm pivots about said spindle on a third axis.

The pivoting member may further include a pair of flanges, said support arm being coupled to said flanges with a pivot pin.

The single arm adjustment mechanism may further comprise a first bushing disposed between each of said flanges and said support arm; and a second bushing disposed between said lower adjustment assembly base and said pivoting member; wherein said first and second bushings provide sufficient friction to hold said support arm in place.

The object may be a table. The support may be an arm of a chair. The support may be a backrest of a chair.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
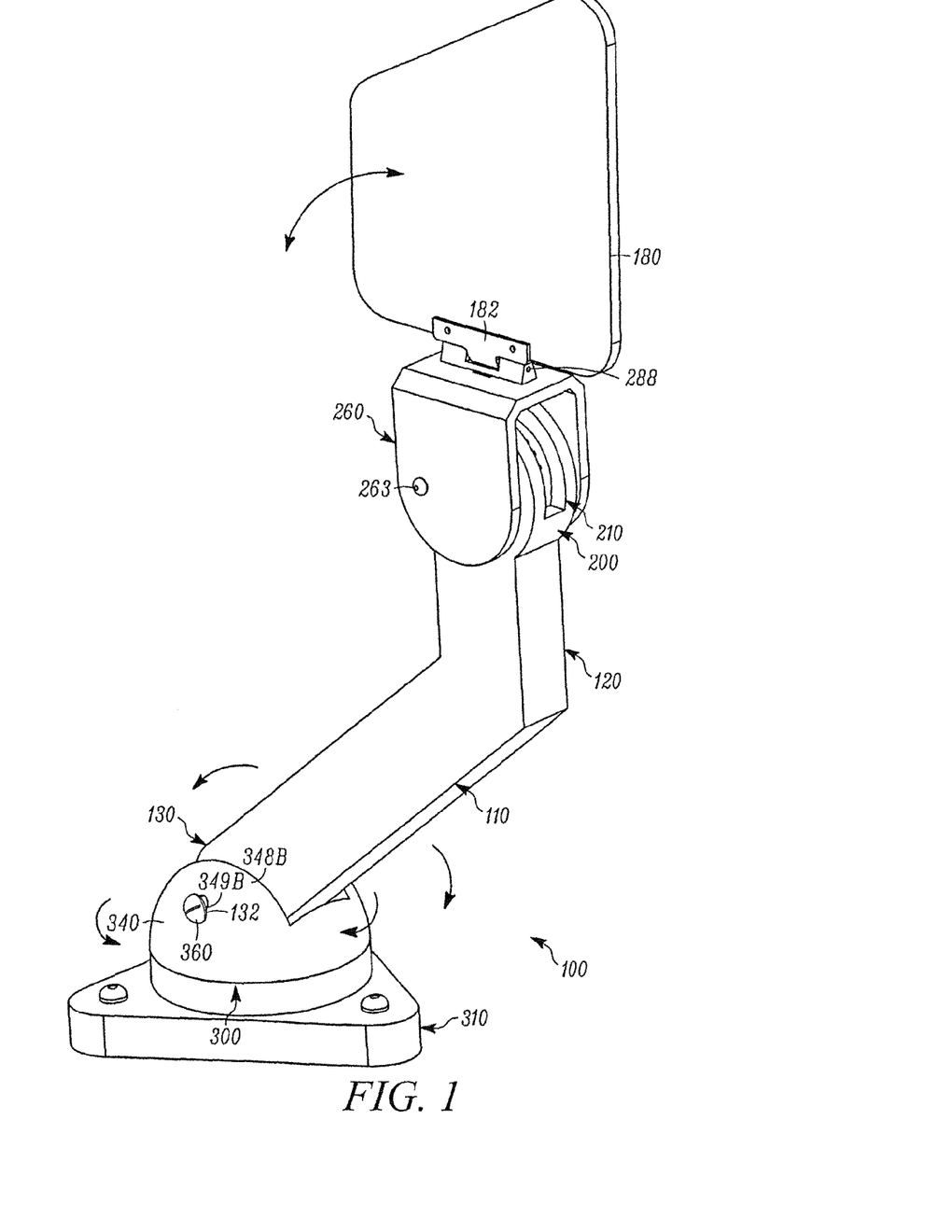
FIG. 1 shows a perspective view of one embodiment of a single arm adjustment mechanism for supporting an object according to the present invention.
Figure 2:
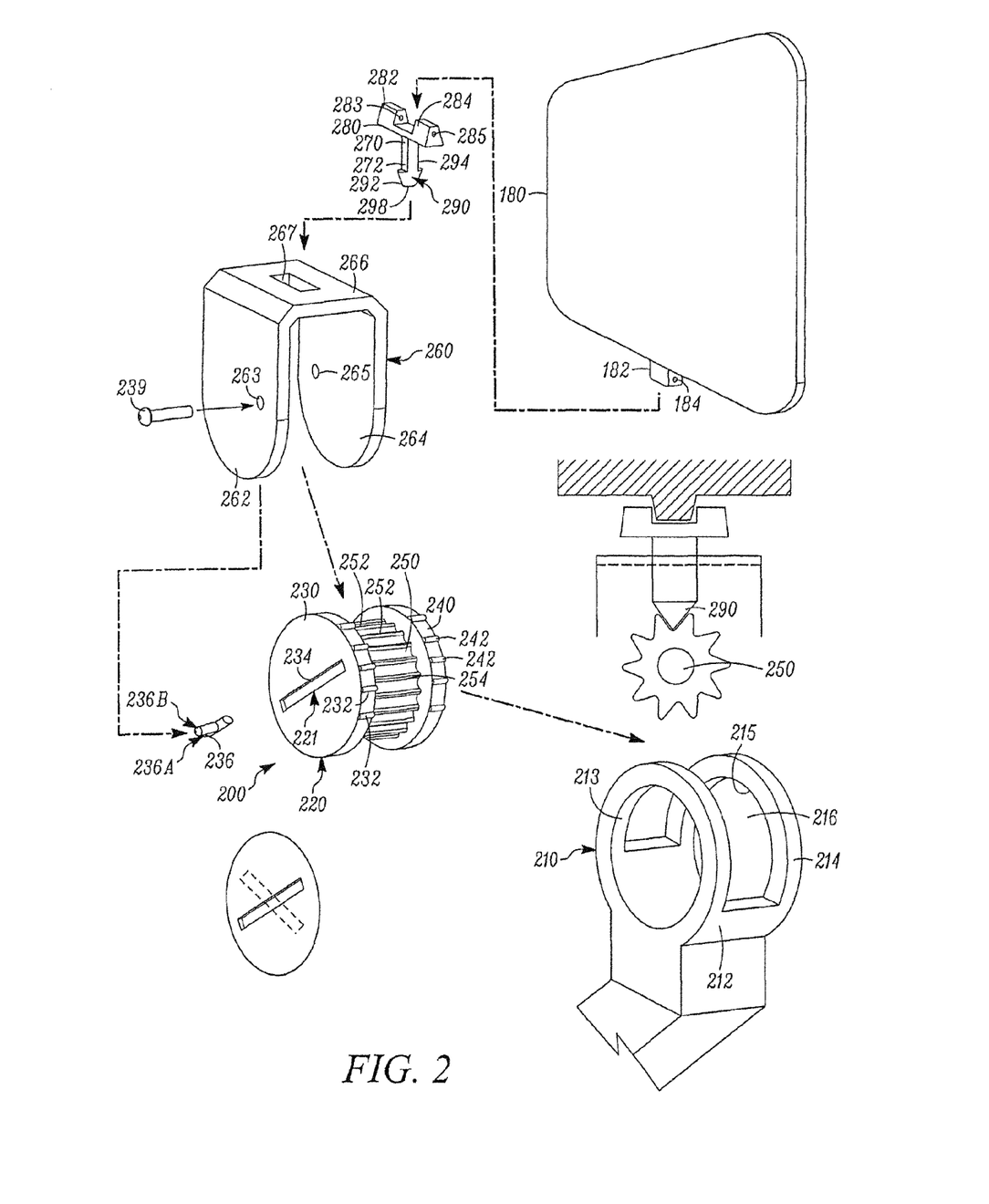
FIG. 2 shows an exploded perspective view of one embodiment of an upper adjustment assembly of the single arm adjustment mechanism of FIG. 1.
Figure 3:
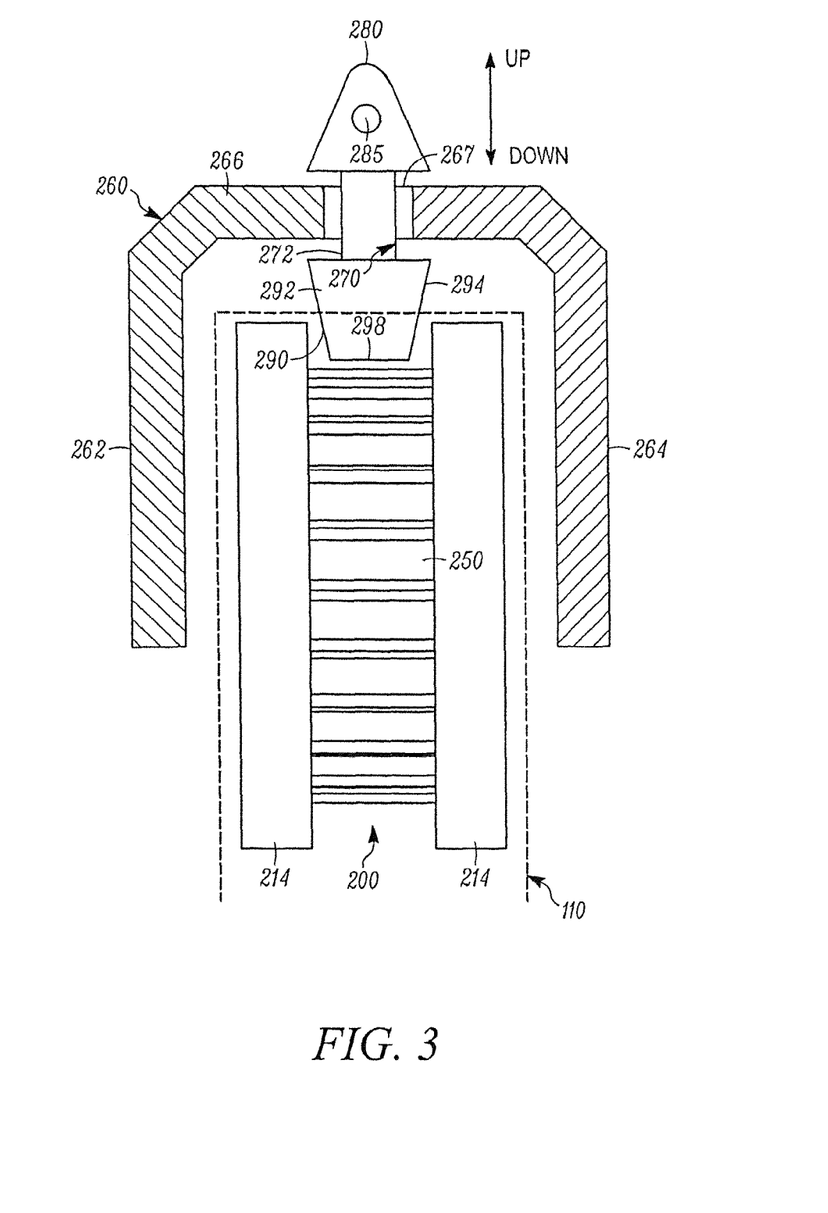
FIG. 3 shows a close-up side and front view of the upper adjustment assembly of the single arm adjustment mechanism of FIG. 2.
Figure 4:
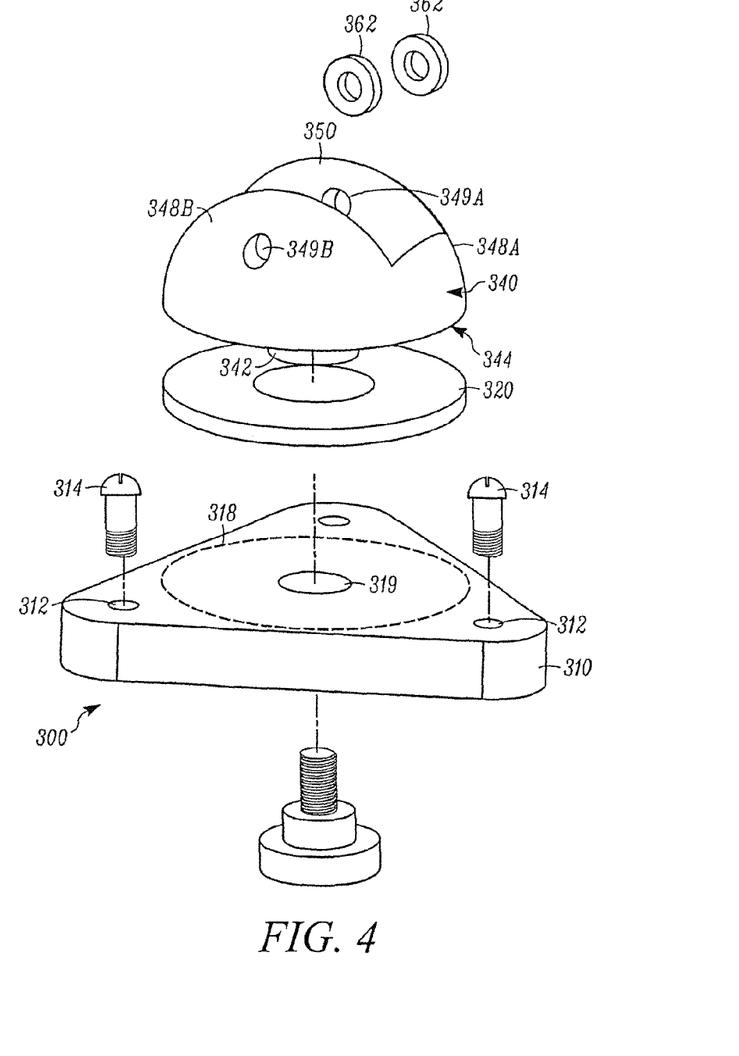
FIG. 4 shows an exploded perspective view of one embodiment of a lower adjustment assembly of the single arm adjustment mechanism of FIG. 1.

Embodiments of the present invention provide a single arm adjustment mechanism for supporting an object, such as a stowable aircraft or vehicle table, a video screen, etc. FIG. 1 shows a perspective view of one embodiment of a single arm adjustment mechanism 100 for supporting an object according to the present invention. FIG. 2 shows an exploded perspective view of one embodiment of an upper adjustment assembly 200 of the single arm adjustment mechanism 100 of FIG. 1. FIG. 3 shows a close-up side and front view of the upper adjustment assembly 200 of the single arm adjustment mechanism 100 of FIG. 2. FIG. 4 shows an exploded perspective view of one embodiment of a lower adjustment assembly 300 of the single arm adjustment mechanism 100 of FIG. 1.

With reference to FIG. 1, the single arm adjustment mechanism 100 includes a support arm 110 having an upper end 120 and a lower end 130. An upper adjustment assembly 200 is coupled to the upper end 120 of the support arm 110. An object to be supported 180 may be coupled to the upper adjustment assembly 200. The lower end 130 of the support arm 110 is coupled to a lower adjustment assembly 300.

In a preferred embodiment, the object 180 may be a tray table or video screen for use, for example, in association with an aircraft or vehicle seat. However, it is understood that the single arm adjustment mechanism 100 may be used with other objects and in other applications as desired, given the disclosure provided herein.

With reference to FIGS. 1-3, the upper adjustment assembly 200 may include a housing 210, a connecting cylinder 220, a base 260, and an object attaching block 270. In this embodiment, the housing 210 includes first and second bearing housings 212, 214 separated by an opening 216. In some embodiments, the housing 210 may be integrally formed in the upper end 120 of the support arm 110. However, it is understood that the housing 210 of the upper adjustment assembly 200 may be coupled to the upper end 120 of the support arm 110 using, by way of example and not limitation, mechanical fasteners, glues, epoxies, etc.

The bearing housings 212, 214 are configured to receive the connecting cylinder 220. The connecting cylinder 220 may include first and second rollers 230, 240, and a gear 250 sandwiched between and coupled to the first and second rollers 230, 240. The gear 250 includes a plurality of teeth 252 and grooves 254 evenly spaced about a circumference of the gear 250. The first and second rollers 230, 240 each include a plurality of roller bearings 232, 242, respectively. The roller bearings 232, 242 are designed to contact an inside surface 213, 215 of the bearing housings 212, 214, respectively. This allows for free rotation of the connecting cylinder 220 within the bearing housings 212, 214 respectively.

Each of the rollers 230, 240 may include a slot or rail 234, 244 in an outside surface thereof. The slot or rail 234, 244 is configured to receive a corresponding slide 236, 246. Each of the slides 236, 246 may include a first portion 236a, 246a adapted to slidingly engage the slot or rail 234, 244, respectively. Each of the slides 236, 246 may also include an attachment portion 236b, 246b extending substantially perpendicularly from the respective first portions 236a, 246a. The attachment portion 236b, 246b is adapted to receive a pin or screw 239. The function and operation of the slides 236, 246 will be discussed in more detail below.

The upper adjustment assembly 200 also includes a base 260 designed to secure the connecting cylinder 220 within the housing 210, and to provide a connection point for the object 180. In one embodiment, the base 260 may have an inverted "U" shape. In this embodiment, the base 260 may have first and second sides 262, 264, projecting substantially perpendicularly downwardly from a top portion 266. Each of the first and second sides 262, 264 may include an opening 263, 265 which is offset from a central axis 221 of the connecting cylinder 220. The opening 263, 265 is configured to receive the pin or screw 239, which connects to the attachment portion 236b, 246b of the slides 236, 246, respectively. This configuration allows the base 260, and thus the object 180 to rotate with respect to the housing 210.

The top portion 266 of the base 260 includes an opening 267 designed to slidingly engage the attaching block 270. The attaching block 270 includes an upper portion 280, a central portion 272, and a lower portion 290. The upper portion 280 of the attaching block 270 is configured to receive the object 180 to be supported. In a preferred embodiment, the upper portion 280 may include first and second flanges 282, 284 separated by a gap or opening 286. In this embodiment, each of the first and second flanges 282, 284 includes an opening 283, 285, respectively, extending transversely therethrough. The opening 283, 285 is configured for receiving a hinge pin 288. In this embodiment, the object 180 may include a flange 182 having a hole 184 extending transversely therethrough. The hinge pin 288 passes through the opening 283, the hole 184, and the opening 285 to pivotally connect the object 180 to the upper adjustment assembly 200.

In one embodiment, the central portion 272 of the attaching block 270 may have a substantially rectangular cross-sectional area. In this embodiment, the opening 267 in the base 260 also has a substantially rectangular cross-sectional area that is slightly larger than the cross-sectional area of the central portion 272. This allows the attaching block 270 to slide freely in a perpendicular direction with respect to the base 260. However, it is understood that other cross-sectional shapes may also be used.

The lower portion 290 of the attaching block 270 may be provided with one or more flanges 292, 294 which extend from the central portion 270 to prevent the attaching block 270 from disengaging with the base 260. The lower portion 290 of the attaching block 270 also includes a stop portion 298 configured to engage the teeth 252 and grooves 254 of the gear 250 to prevent rotation. In the illustrated embodiment of the attaching block 270, the first and second flanges 282, 284 of the upper portion 280 are provided at right angles to the flanges 292, 294 of the lower portion 290. However, it is understood that these flanges may be provided at any angle with respect to each other, as long as the lower flanges 292, 294 are of sufficient size to prevent the attaching block 270 from disengaging with the base 260.

With reference to FIG. 4, the lower adjustment assembly 300 includes a base 310 and pivoting member 340. The base 310 includes a plurality of mounting holes 312 which allow the base 310 to be connected to a support surface (not shown) using any type of mechanical fastener 314 known to those of skill in the art. By way of example and not limitation, the support surface may be an arm or back of a seat in an aircraft or vehicle. Alternately, the base 310 may be attached to the support surface using glues or epoxies. The base 310 also includes an opening 319.

The pivoting member 340 includes a spindle or pivot pin 342 which extends substantially perpendicularly downwardly from a lower surface 344 of the pivoting member 340. The pivoting member 340 also includes one or more flanges 348. In a preferred embodiment, the pivoting member 340 includes a pair of flanges 348a, 348b separated by a gap 350. Each of the flanges 348a, 348b may include a hole 349a, 349b respectively, extending therethrough. The lower portion 130 of the support arm 110 may include a hole 132 extending therethrough. In this configuration, the lower portion 130 of the support arm 110 is configured to fit within the gap 350 between the flanges 348a, 348b of the pivoting member 340. A pivot pin 360 may then be inserted through the holes 349a, 132 and 349b to pivotally connect the support arm 110 to the lower adjustment assembly 300. In some embodiments, the pivoting member 340 may also include a stop 343 which restricts the rotational movement of the support arm 110. The angle of rotation of the support arm is selected based on desired envelope of movement and nominal height of the table. For example, 45 degrees.

In a preferred embodiment, the lower adjustment assembly 300 may also include a lower washer 320 fitted between the lower surface 344 of the pivoting member 340 and an upper surface 318 of the base 310. The spindle or pivot pin 342 of the pivoting member 340 extends through a corresponding opening 319 in the base 310. A fastener, such as a bolt and washer combination (not shown), may then be used to attach the pivoting member 340 to the base 310. By adjusting the amount of torque that is applied to the fastener, the lower washer 320 may then be compressed to provide for friction between the pivoting member 340 and the base 310 to hold the support arm 110 in a desired rotational position.

Similarly, one or more washers 362 may be provided between the flanges 348a 348b and the lower portion 130 of the support arm 110. In this embodiment, a bolt and nut may be used as the pin 360. By adjusting the amount of torque on the bolt used as the pin 360, the washers 362 may then be compressed to provide for friction between the flanges 348a 348b and the lower portion 130 of the support arm 110 to hold the support arm 110 in a desired pivoting position.

The various components of the single arm adjustment mechanism 100 may be made from different materials, depending for example on the weight of the object 180 to be supported. For example, the washers 320, 362 may be made from rubber. However, other materials may also be used. The support arm 110, the housing 210, the base 260, the object attaching block 270, the base 310 and the pivoting member 340 may be made from metal. The gear 250 may be made from metal. However, it is understood that other materials may be used for the various components without departing from the scope of the present embodiments. Furthermore, it is understood that the specific size of the gear 250 and the number of teeth 252 and grooves 254 in the gear 250 may be adjusted as desired for specific applications.

With continuing reference to FIGS. 2-4, the operation of the single arm adjustment mechanism 100 will now be described. The upper adjustment assembly 200 allows the object 180 to be pivoted about a first axis, ie. the rotational axis of the connecting assembly 220. Similarly, the support arm 110 pivots on a second axis that is parallel to the first axis. Advantageously, this allows the object 180 to be maintained in a desired angular orientation with respect to the support, regardless of the angle of the support arm 110. Additionally, the slides 236, 246 which slidingly engage the slot or rail 234, 244, respectively, provide a limit to the amount of rotation of the connecting cylinder 220 and thus the object 180.

Figure 6:
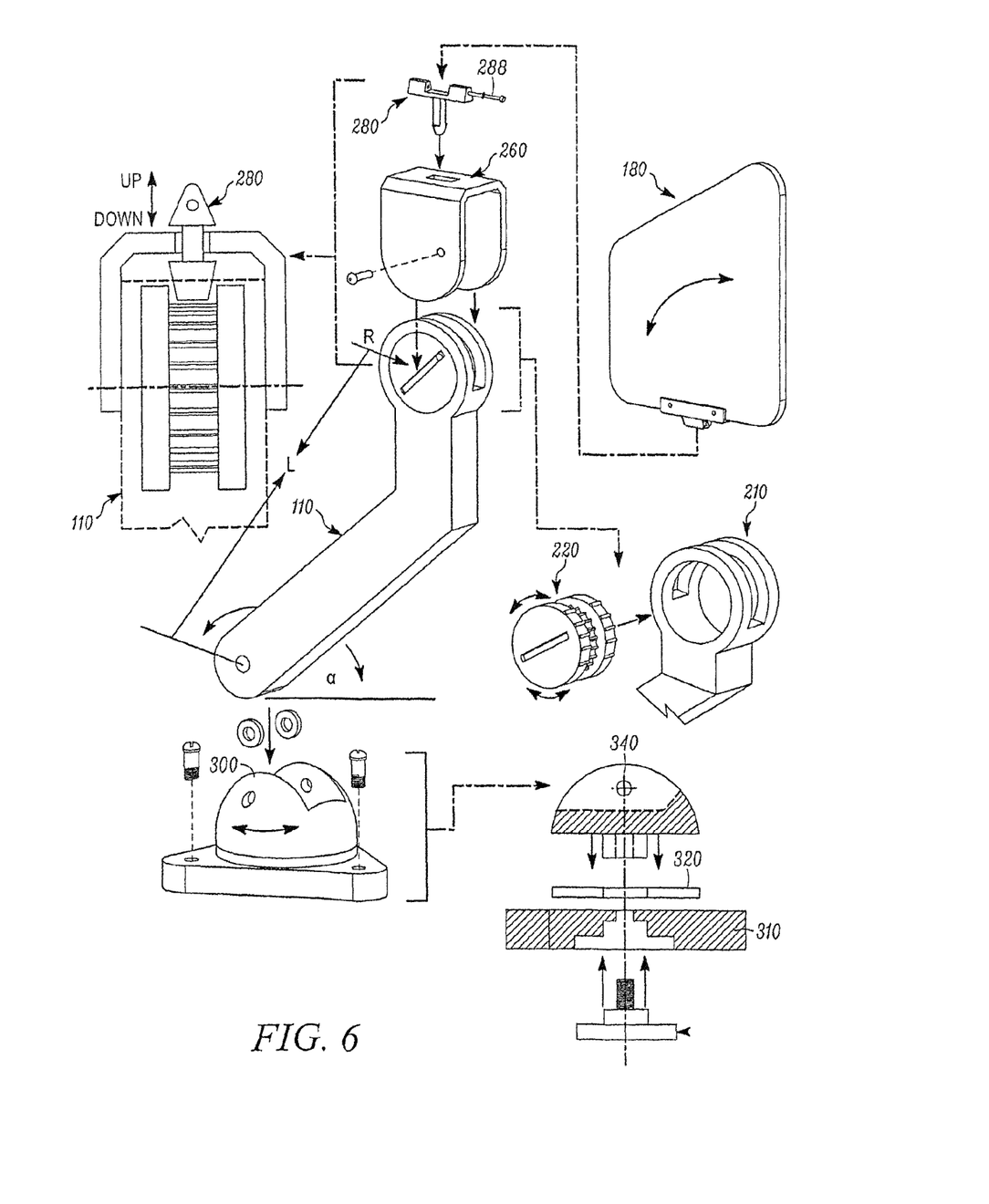
FIG. 6 shows an exploded perspective view of FIG. 1.

Typically, the radius of the connecting cylinder 220 ranges from 2.5 to 3.5 cm. The length of the groove 254 is closer to or shorter than the radius of the connecting cylinder 220. The height variations of the table can be determined using the following formula (refer to FIG. 6):

$$L/(\sin(\alpha+\phi) \pm r/\text{sqrt} \tag{2}$$

where L is the effective length of the support arm 110, $\alpha$ is the angle between the support arm 110 and the base 310, $\phi$ is the angle of rotation of the support arm 110 and r is the radius of the connecting cylinder 220.

Furthermore, the lower adjustment assembly 300 also allows the support arm 110 to pivot about the spindle or pivot pin 342 of the pivoting member 340 on a third axis of the spindle 342. In a preferred embodiment, this configuration may provide for 360 degrees of rotation.

In a preferred embodiment, the single arm adjustment mechanism 100 may be coupled to an arm of an aircraft or vehicle seat. In this embodiment, the single arm adjustment mechanism 100 and seat combination may be configured such that the single arm adjustment mechanism 100 may be stored within the arm or back of the seat when not in use.

Figure 5A:
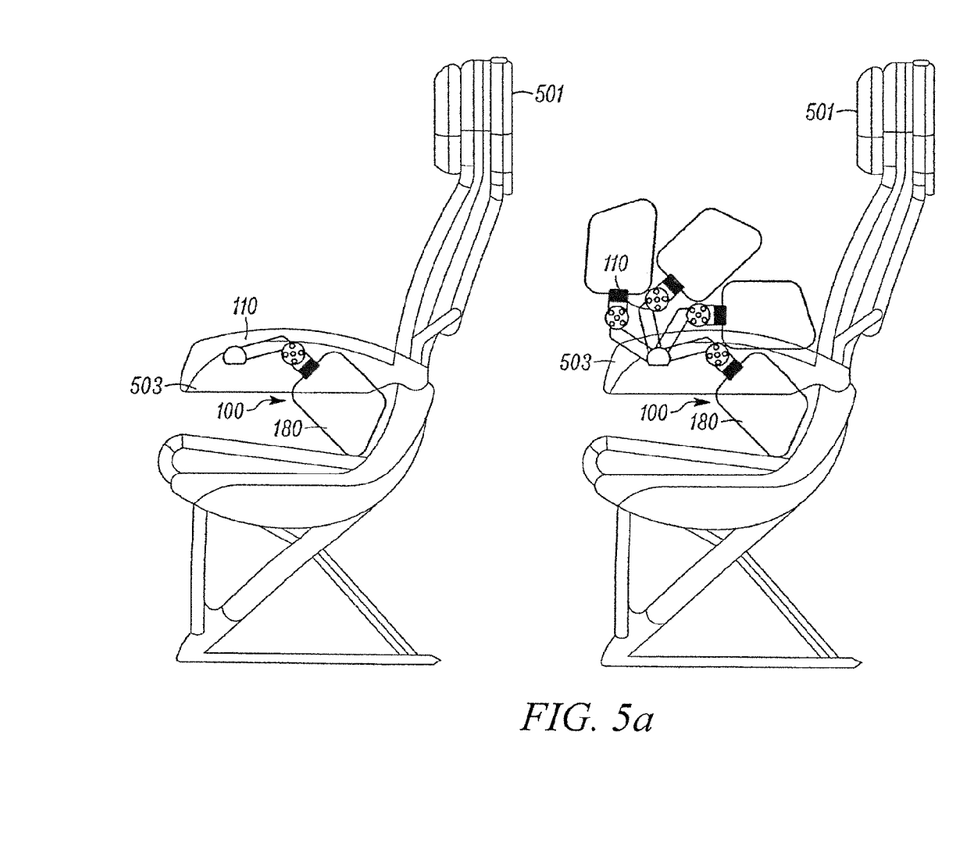
FIG. 5a shows a side view of a plurality of aircraft or vehicle seats with the single arm adjustment mechanism of FIG. 1.

FIG. 5a, for example, is a side view of a plurality of aircraft or vehicle seats 501 to illustrate how the single arm adjustment mechanism 100 may be coupled to an arm 503 of the aircraft or vehicle seat 501. In this embodiment, the single arm adjustment mechanism 100 and the aircraft or vehicle seat 501 are configured such that the single arm adjustment mechanism 100 may be stored within the arm 503 the aircraft or vehicle seat 501 when not in use.

Embodiments of the present invention as described provide several advantages over the prior art. For example, when the object 180 is, for example, a table or video screen, the embodiments of the present invention allow a passenger to adjust the height of the table, the lateral distance of the table (ie. close to or farther away from the passenger), and the planar orientation of the table.

Figure 5B:
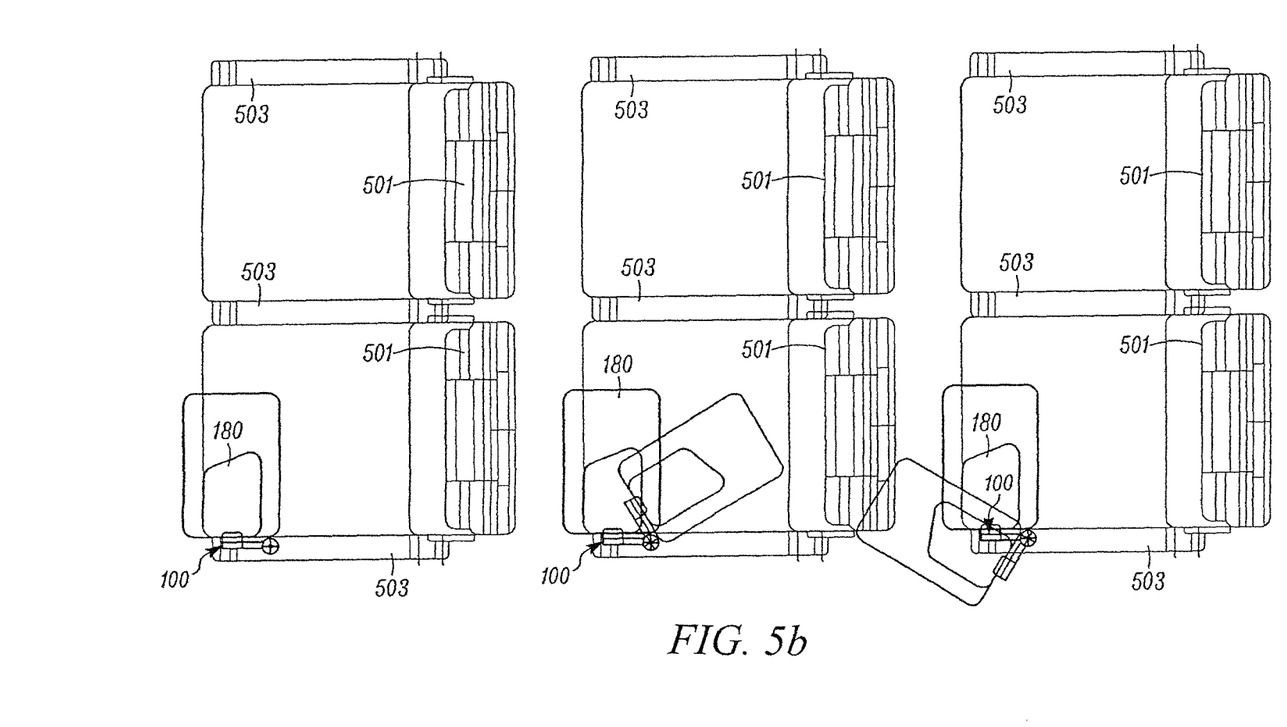
FIG. 5b shows a plan view of a plurality of aircraft or vehicle seats with the single arm adjustment mechanism of FIG. 1.
Figure 5C:
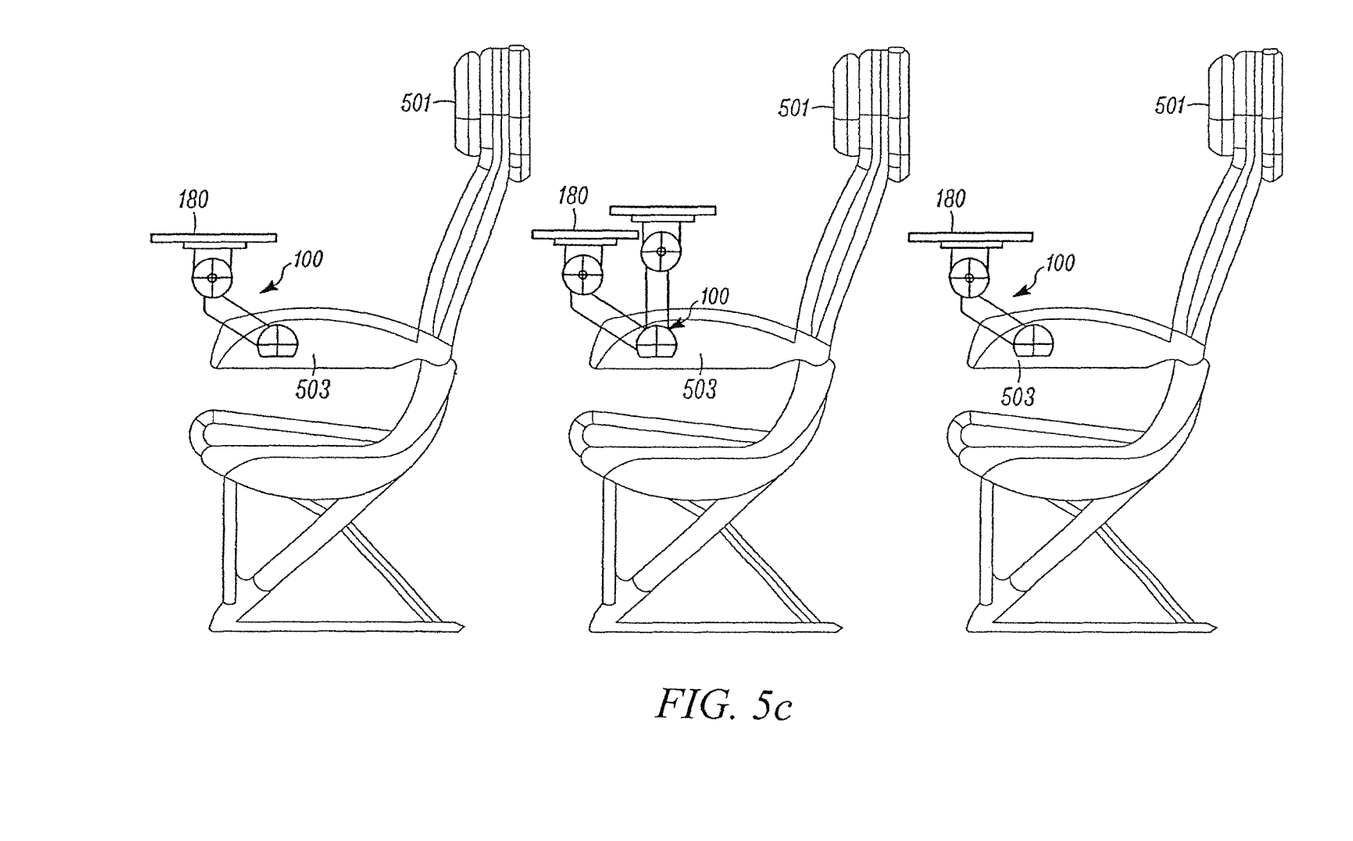
FIG. 5c shows another side view of a plurality of aircraft or vehicle seats with the single arm adjustment mechanism of FIG. 1.

In a preferred embodiment, as illustrated by FIG. 5c, the single arm adjustment mechanism 100 in this configuration allows the passenger to make adjustments to the height of the table while simultaneously maintaining the planar orientation of the table to be substantially horizontal.

Additionally, as illustrated in FIG. 5b, the single arm adjustment mechanism 100 may be rotated about the spindle 342 to allow the passenger to exit the aircraft or vehicle seat 501 without stowing the table or removing any objects from the table.

It will be appreciated by a person skilled in the art that numerous variations and/or modifications may be made to the present invention as shown in the specific embodiments without departing from the scope of the invention as broadly described. The present embodiments are, therefore, to be considered in all respects to be illustrative and not restrictive.

The invention claimed is:

1. A single arm adjustment mechanism for supporting an object, the single arm adjustment mechanism comprising:
   a support arm;
   an upper adjustment assembly coupled to an upper end of said support arm, said upper adjustment assembly capable of being coupled to said object such that said object pivots about a first axis; and
   a lower adjustment assembly capable of being fixed to a support and pivotally coupled to a lower end of said support arm such that said support arm pivots about a second axis parallel to said first axis in order to maintain said object in a desired angular orientation with respect to said support,
   wherein said lower adjustment assembly further comprises:
   a lower adjustment assembly base; and
   a pivoting member coupled to said support arm such that said support arm pivots about said second axis, said pivoting member having a spindle extending through said lower adjustment assembly base, such that said support arm pivots about said spindle on a third axis,
   wherein said pivoting member further includes a pair of flanges, said support arm being coupled to said flanges with a pivot pin.

2. The single arm adjustment mechanism of claim 1, wherein said upper adjustment assembly comprises:
   a housing coupled to said upper end of said support arm;

a connecting cylinder having a gear, said connecting cylinder disposed within the housing such that said connecting cylinder is free to rotate within said housing;

a base coupled to said connecting cylinder; and an object attaching block slidingly disposed within said base, said object attaching block including a lower portion configured to engage with said gear, wherein said object is coupled to said object attaching block, such that said object may be raised to disengage said lower portion of said object attaching block to allow said object to be rotated about said first axis to a desired position, and said object may be lowered to engage said lower portion of said object attaching block to fix said object in said desired position.

3. The single arm adjustment mechanism of claim 2, wherein said connecting cylinder further comprises:

a first roller having a linear slot offset from an axis of said cylinder, said first roller being coupled to one side of said gear;

a first slide disposed within said linear slot of said first roller;

a second roller having a linear slot offset from an axis of said cylinder, said second roller being coupled to an opposite side of said gear; and a second slide disposed within said linear slot of said second roller, wherein said base is coupled to said first and second slides such that said first and second slides restrict rotational movement of said cylinder to less than 180 degrees.

4. The single arm adjustment mechanism of claim 1, further comprising:

a first bushing disposed between each of said flanges and said support arm; and a second bushing disposed between said lower adjustment assembly base and said pivoting member, wherein said first and second bushings provide sufficient friction to hold said support arm in place.

5. The single arm adjustment mechanism of claim 1, wherein said object is a table.

6. The single arm adjustment mechanism of claim 1, wherein said support is an arm of a chair.

7. The single arm adjustment mechanism of claim 1, wherein said support is a backrest of a chair.

8. A single arm adjustment mechanism for supporting an object, the single arm adjustment mechanism comprising:

a support arm;

an upper adjustment assembly coupled to an upper end of said support arm, said upper adjustment assembly capable of being coupled to said object such that said object pivots about a first axis; and a lower adjustment assembly capable of being fixed to a support and pivotally coupled to a lower end of said support arm such that said support arm pivots about a second axis parallel to said first axis in order to maintain said object in a desired angular orientation with respect to said support, wherein said upper adjustment assembly comprises:

a housing coupled to said upper end of said support arm;

a connecting cylinder having a gear, said connecting cylinder disposed within the housing such that said connecting cylinder is free to rotate within said housing;

a base coupled to said connecting cylinder; and an object attaching block slidingly disposed within said base, said object attaching block including a lower portion configured to engage with said gear, wherein said object is coupled to said object attaching block, such that said object may be raised to disengage said lower portion of said object attaching block to allow said object to be rotated about said first axis to a desired position, and said object may be lowered to engage said lower portion of said object attaching block to fix said object in said desired position.

9. The single arm adjustment mechanism of claim 8, wherein said lower adjustment assembly further comprises:

a lower adjustment assembly base; and a pivoting member coupled to said support arm such that said support arm pivots about said second axis, said pivoting member having a spindle extending through said lower adjustment assembly base, such that said support arm pivots about said spindle on a third axis.

10. The single arm adjustment mechanism of claim 9, wherein said pivoting member further includes a pair of flanges, said support arm being coupled to said flanges with a pivot pin.

* * * * *